(12) United States Patent
Wei

(10) Patent No.: US 12,103,361 B2
(45) Date of Patent: Oct. 1, 2024

(54) VENTILATION SYSTEM AND AIR CONDITION APPARATUS

(71) Applicant: Jung-Tsung Wei, Tainan (TW)

(72) Inventor: Jung-Tsung Wei, Tainan (TW)

( * ) Notice: Subject to any disclaimer, the term of this patent is extended or adjusted under 35 U.S.C. 154(b) by 322 days.

(21) Appl. No.: 17/698,220

(22) Filed: Mar. 18, 2022

(65) Prior Publication Data
US 2022/0297508 A1  Sep. 22, 2022

(30) Foreign Application Priority Data

Mar. 19, 2021 (TW) ................. 110110058

(51) Int. Cl.
*B60H 1/24* (2006.01)
*B60H 1/00* (2006.01)

(52) U.S. Cl.
CPC ............. *B60H 1/248* (2013.01); *B60H 1/008* (2013.01); *B60H 1/00821* (2013.01); *B60H 2001/00178* (2013.01)

(58) Field of Classification Search
CPC .... B60H 1/248; B60H 1/008; B60H 1/00821; B60H 1/242; B60H 1/00564; B60H 1/00207; B60H 1/28; B60H 1/0005; B60H 1/00028; B60H 1/00457; B60H 1/00742; B60H 1/00835; B60H 1/00985; B60H 1/2225; B60H 2001/00178; B60H 2001/00214; B60H 2001/00099; B60H 2001/00192; B60H 3/0608
See application file for complete search history.

(56) References Cited

U.S. PATENT DOCUMENTS

| 2,627,218 A * | 2/1953 | Katz ................... B60H 1/00035 237/12.3 A |
| 7,357,176 B2 * | 4/2008 | Yelles ................ B60H 1/00849 62/133 |
| 10,717,347 B2 * | 7/2020 | Kwon .................... B60H 3/022 |

(Continued)

FOREIGN PATENT DOCUMENTS

| CN | 105674412 A * | 6/2016 |
| CN | 106377975 A | 2/2017 |

(Continued)

OTHER PUBLICATIONS

Search Report appended to an Office Action, which was issued to Taiwanese counterpart application No. 110110058 by the TIPO on Sep. 5, 2022, with an English translation thereof.
Search Report issued to European counterpart application No. 22162675.7 by the EPO on Aug. 22, 2022.

*Primary Examiner* — Steve Clemmons
(74) *Attorney, Agent, or Firm* — Brooks Kushman P.C.

(57) ABSTRACT

A ventilation system is adapted to be used in a vehicle. The vehicle includes a vehicle body that defines an interior space. The ventilation system includes a vent pipe and a fan. The vent pipe is adapted to be disposed on the vehicle body, and has an outside communicating end via which the vent pipe is adapted to communicate with the outside of the vehicle body, and an inside communicating end via which the vent pipe is adapted to communicate with the interior space. The fan is disposed in the vent pipe, and is configured to be activated to produce airflow from the outside communicating end to the inside communicating end.

7 Claims, 9 Drawing Sheets

(56) References Cited

U.S. PATENT DOCUMENTS

| | | | | |
|---|---|---|---|---|
| 2006/0144061 A1* | 7/2006 | Badenhorst | ........ | B60H 1/00742 |
| | | | | 62/126 |
| 2013/0037252 A1* | 2/2013 | Major | ................ | B60H 1/00742 |
| | | | | 165/237 |
| 2018/0134120 A1* | 5/2018 | Marginean | ............ | B60H 1/3407 |
| 2019/0381863 A1 | 12/2019 | Currle | | |
| 2022/0055439 A1* | 2/2022 | Varughese | ......... | B60H 1/00028 |
| 2022/0203804 A1* | 6/2022 | Shimomura | ........... | B60K 28/06 |
| 2022/0371401 A1* | 11/2022 | Roth | .................. | B60H 1/00735 |
| 2023/0226884 A1* | 7/2023 | Van Dijk | ............... | B60H 1/248 |
| | | | | 165/42 |

FOREIGN PATENT DOCUMENTS

| | | | | |
|---|---|---|---|---|
| CN | 208035899 U | | 11/2018 | |
| CN | 109982881 A | | 7/2019 | |
| CN | 111907291 A | * | 11/2020 | ......... B60H 1/00735 |
| DE | 4217393 A1 | * | 12/1993 | ............ B60H 1/008 |
| DE | 102006003071 A1 | | 8/2007 | |
| EP | 0857593 B1 | * | 4/2005 | |
| EP | 2202106 A1 | * | 6/2010 | ......... B60H 1/00371 |
| IN | 212708837 U | | 3/2021 | |
| TW | M528259 U | * | 9/2016 | |
| WO | WO-8908564 A1 | * | 9/1989 | |

* cited by examiner

VENTILATION SYSTEM AND AIR CONDITION APPARATUS

CROSS-REFERENCE TO RELATED APPLICATION

This application claims priority of Taiwanese Invention Patent Application No. 110110058, filed on Mar. 19, 2021.

FIELD

The disclosure relates to a ventilation system and an air conditioning (A/C) apparatus.

BACKGROUND

In order to stabilize temperature inside a passenger compartment of a vehicle, car windows of the vehicle are usually closed when an air conditioning (A/C) system of the vehicle is in operation. However, closed car windows lead to poor ventilation and reduced oxygen concentration in the passenger compartment, which is unsafe, especially after prolonged operation of the AC system. Under such unsafe condition, a driver may be easily fatigued, find it difficult to concentrate, and be prone to making mistakes and getting in a traffic accident.

SUMMARY

Therefore, an object of the disclosure is to provide a ventilation system and an air conditioning (A/C) apparatus that can alleviate at least one of the drawbacks of the prior art.

According to one aspect of the disclosure, the ventilation system is adapted to be used in a vehicle. The vehicle includes a vehicle body that defines an interior space. The ventilation system includes a vent pipe and a fan.

The vent pipe is adapted to be disposed on the vehicle body, and has an outside communicating end via which the vent pipe is adapted to communicate with the outside of the vehicle body, and an inside communicating end via which said vent pipe is adapted to communicate with the interior space.

The fan is disposed in the vent pipe, and is configured to be activated to produce airflow from the outside communicating end to the inside communicating end.

According to another aspect of the disclosure, the A/C apparatus is adapted to be used in a vehicle. The vehicle includes a vehicle body that defines an interior space. The A/C apparatus includes an A/C system and a ventilation system.

The A/C system includes an air duct, an A/C device and a blower.

The air duct has an external inlet end via which the air duct is adapted to communicate with the outside of the vehicle, and a plurality of outlet ends via which the air duct is adapted to communicate with the interior space of the vehicle.

The A/C device is disposed in the air duct, and is configured to be controlled to regulate temperature of air flowing through said A/C device.

The blower is disposed in the air duct, and is configured to be controlled to drive air to flow from the external inlet end through the A/C device to said plurality of outlet ends.

The ventilation system includes a vent pipe and a fan.

A majority of the vent pipe extends along the air duct in the air duct. The vent pipe has an outside communicating end and at least one inside communicating end.

The outside communicating end is exposed out of the air duct. The vent pipe is adapted to communicate with the outside of the vehicle via the outside communicating end.

Said at least one inside communicating end is disposed at one of said plurality of outlet ends of the air duct and communicates with said one of said plurality of outlet ends. The vent pipe is adapted to communicate with the interior space of the vehicle via said at least one inside communicating end.

The fan is disposed in the vent pipe, and is configured to be activated to produce airflow from the outside communicating end to said at least one inside communicating end.

BRIEF DESCRIPTION OF THE DRAWINGS

Other features and advantages of the disclosure will become apparent in the following detailed description of the embodiments with reference to the accompanying drawings, of which.

DETAILED DESCRIPTION

Figure 1:
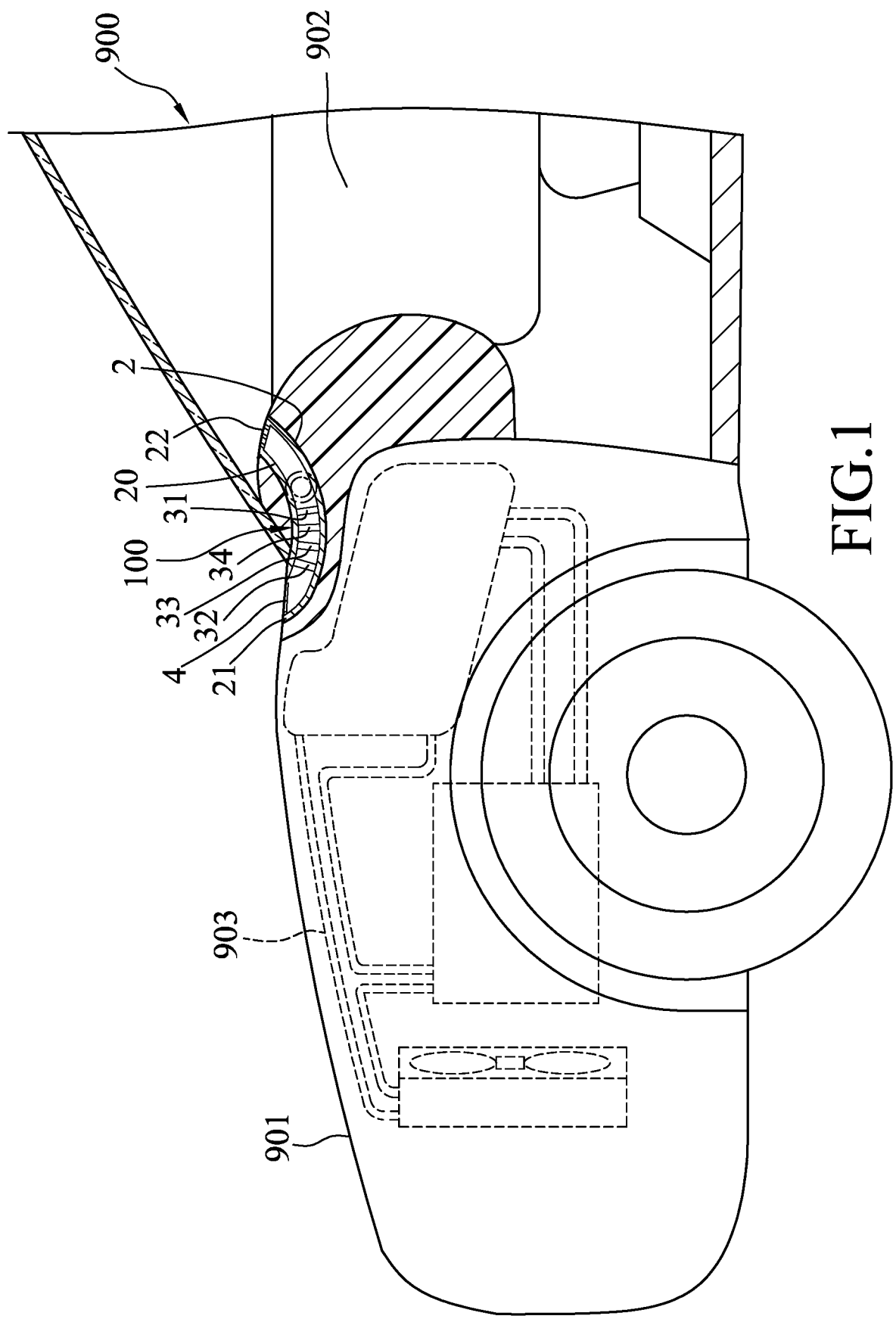
FIG. 1 is a fragmentary, partly sectional schematic view illustrating an example of a ventilation system used in a vehicle according to an embodiment of the disclosure.

Before the disclosure is described in greater detail, it should be noted that where considered appropriate, reference numerals or terminal portions of reference numerals have been repeated among the figures to indicate corresponding or analogous elements, which may optionally have similar characteristics.

Referring to FIGS. 1 to 5, an embodiment of a ventilation system 100 according to the disclosure is illustrated. The ventilation system 100 is adapted to be used in a vehicle 900. The vehicle 900 may be implemented by one of a sedan, a sedan wagon, a van, a hatchback, a sport utility vehicle (SUV), a multi-purpose vehicle, a sports car, a convertible, a bus and so on, but is not limited thereto.

The vehicle 900 includes a vehicle body 901 that defines an interior space 902 (i.e., a passenger compartment), and an air conditioning (A/C) system 903 disposed on the vehicle body 901.

The A/C system 903 includes a plurality of air intakes 904 (only one is shown in the drawings), and a plurality of air outlets 905. The A/C system 903 is configured to be controlled to operate in one of an internal circulation mode and an external circulation mode. When operating in the internal circulation mode, the A/C system 903 is configured to draw air from the interior space 902 via the air intakes 904, to process the air thus drawn by filtering the air and adjusting temperature of the air, and to then expel the air thus processed via the air outlets 905 back to the interior space 902. When operating in the external circulation mode, the A/C system 903 is configured to draw air from the outside of the vehicle 900, to process the air thus drawn by filtering the air and adjusting temperature of the air, and to expel the air thus processed via the air outlets 905 to the interior space 902.

The ventilation system 100 includes a vent pipe 2, a fan 31, a filter 32, a cooler 33, a heater 34, an air valve 4, a controller 51, an oxygen sensor 52 and a timer 53. The controller 51 is adapted to be disposed partially in the interior space of the vehicle body 901, and is electrically connected to the fan 31, the filter 32, the cooler 33, the air valve 4, the oxygen sensor 52 and the timer 53.

Figure 3:
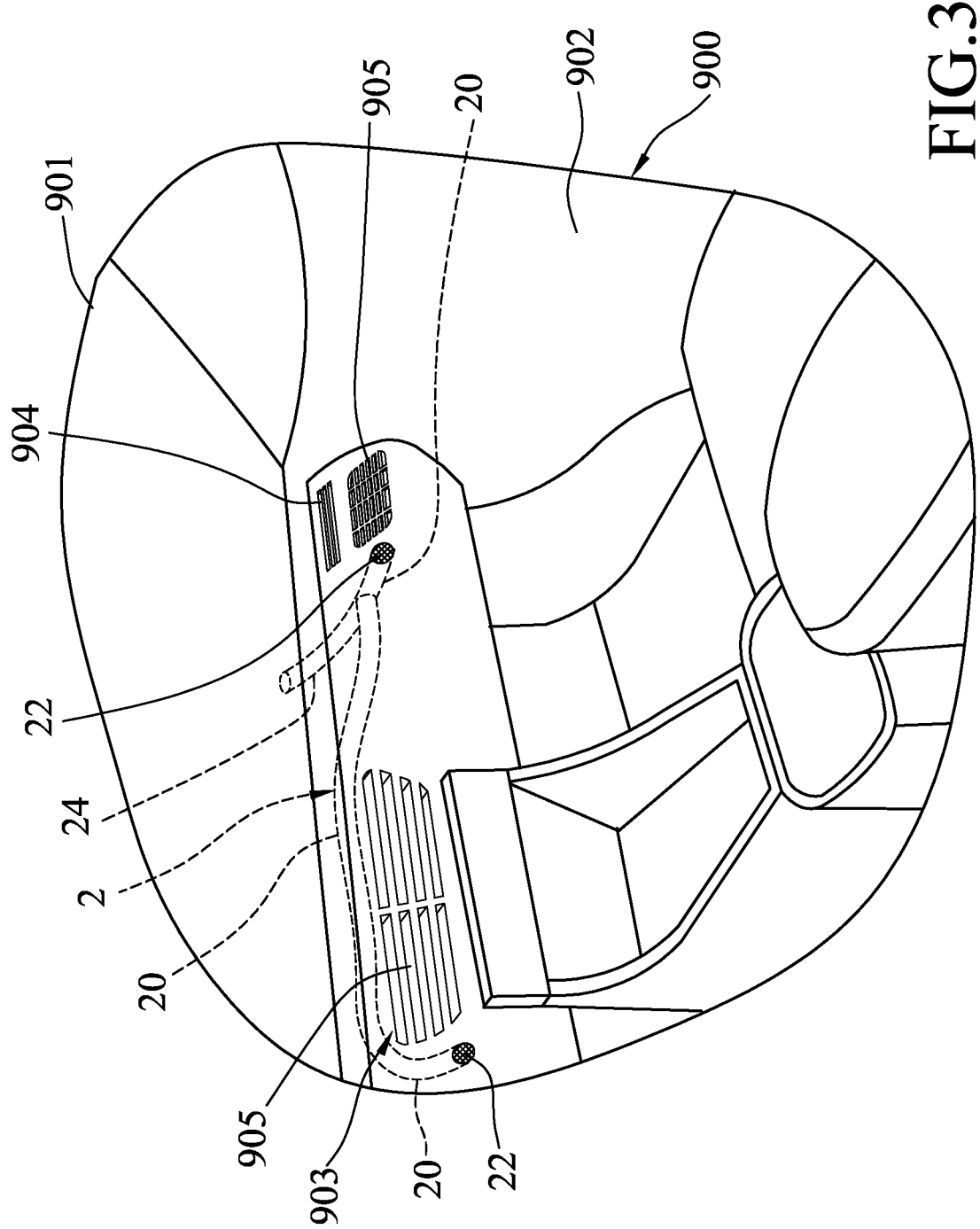
FIG. 3 is a fragmentary perspective view of an interior space of the vehicle for illustrating an exemplary arrangement of a vent pipe of the ventilation system according to an embodiment of the disclosure.
Figure 4:
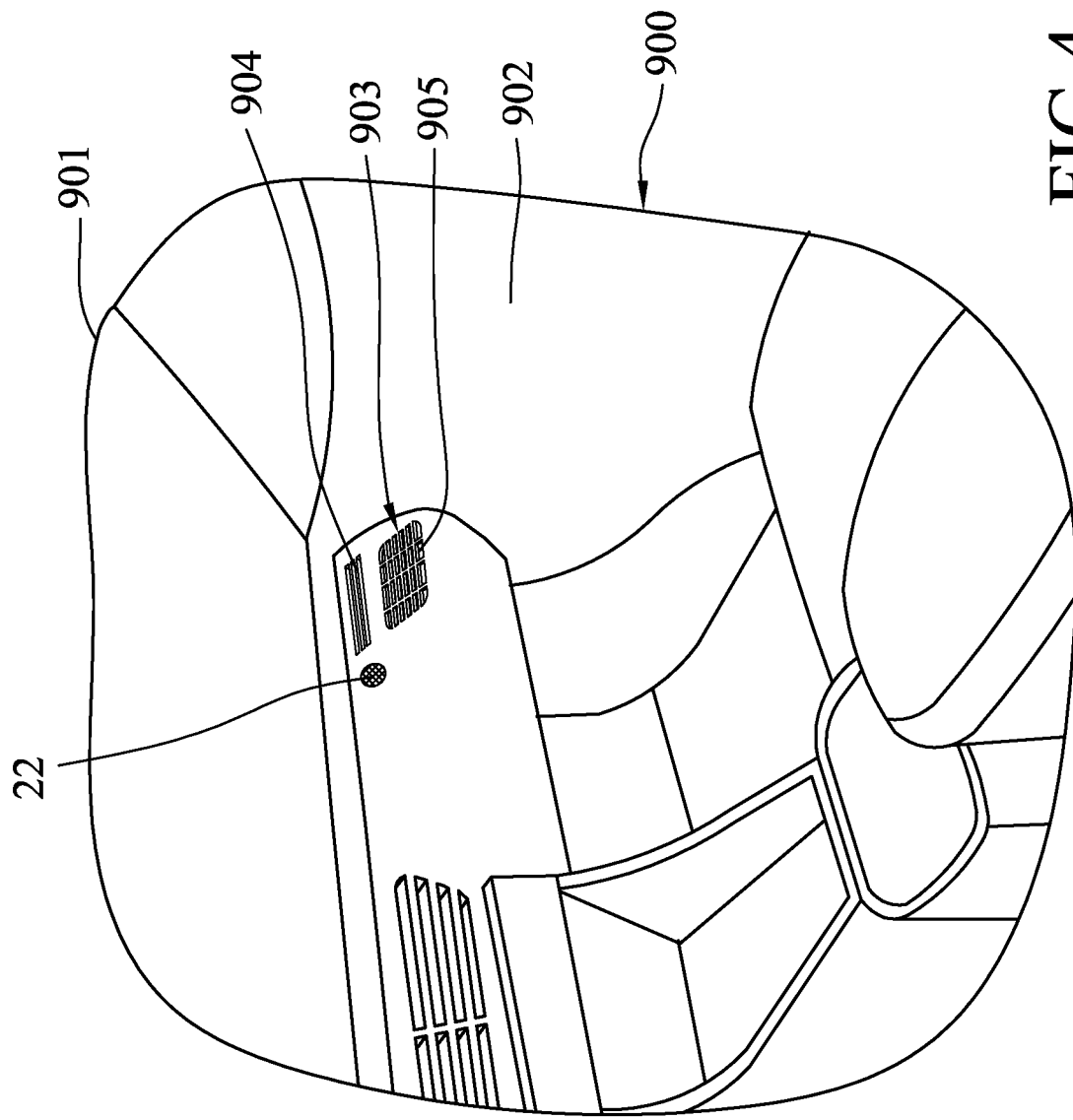
FIG. 4 is a fragmentary perspective view of the interior space of the vehicle for illustrating another exemplary arrangement of the vent pipe of the ventilation system according to an embodiment of the disclosure.
Figure 5:
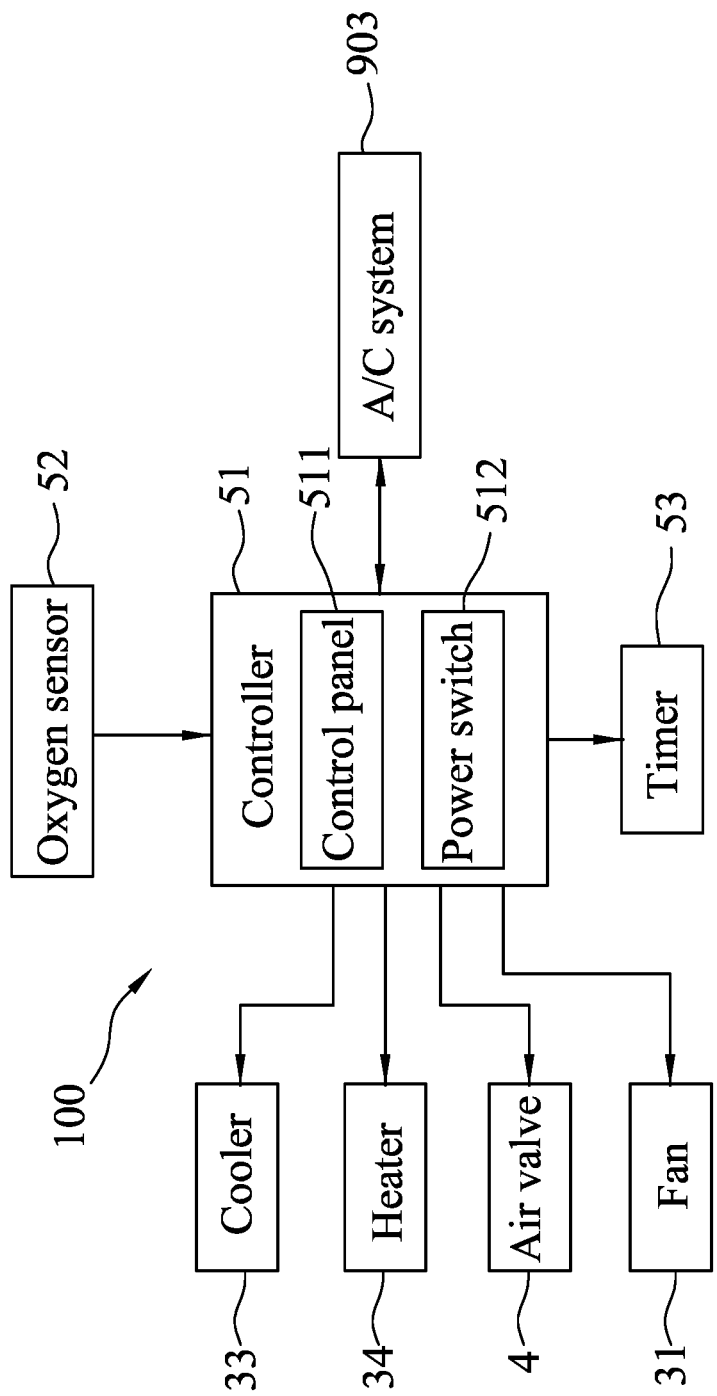
FIG. 5 is a block diagram illustrating an example of the ventilation system according to an embodiment of the disclosure.

The vent pipe 2 is adapted to be disposed on the vehicle body 901, and includes a main pipe 24 and a plurality of side pipes 20. The vent pipe 2 has an outside communicating end 21 via which the vent pipe 2 is adapted to communicate with the outside of the vehicle body 901, and a plurality of inside communicating ends 22 via which the vent pipe 2 is adapted to communicate with the interior space 902. The main pipe 24 defines the outside communicating end 21. The side pipes 20 are connected to the main pipe 24 and respectively define the inside communicating ends 22. The inside communicating ends may be positioned respectively beside the air outlets 905 near a driver seat and a front passenger seat as shown in FIG. 3, and accordingly air flowing from the vent pipe 2 into the interior space 902 can rapidly mix with air flowing out of the air outlets 905 and spread throughout the interior space 902. Alternatively, the inside communicating ends 22 may be positioned respectively beside the air intakes 904 (see FIG. 4, where only one inside communicating end 22 and one air intake 904 are shown). In this way, air flowing from the vent pipe 2 into the interior space 902 can be immediately drawn by the A/C system 903 via the air intakes 904 for further processing, and can then be expelled via the air outlets 905 back to the interior space 902.

It should be noted that the positions of the inside communicating ends 22 are not limited to the disclosure herein and may vary in other embodiments. Each of the inside communicating ends 22 may be positioned at any location that is exposed to the interior space 902.

It should be noted that the number of the inside communicating ends 22 is not limited to what is disclosed herein and may vary in other embodiments. In some embodiments, the vent pipe 2 has only one inside communicating end 22.

The fan 31, the filter 32, the cooler 33 and the heater 34 are disposed in the main pipe 24 of the vent pipe 2, and are arranged in an extension direction of the main pipe 24. The fan 31 is configured to be activated to produce airflow from the outside communicating end 21 to each of the inside communicating ends 22, so air flowing from the outside of the vehicle body 901 into the interior space 902 can be processed by the filter 32, the cooler 33 and the heater 34 in the vent pipe 2.

In one embodiment, the controller 51 is configured to control the fan 31 to rotate in one of a forward direction to produce airflow from the outside communicating end 21 to each of the inside communicating ends 22, and a reverse direction to produce airflow from each of the inside communicating ends 22 to the outside communicating end 21. When the fan 31 rotates in the forward direction, the ventilation system 100 supplies air from the outside of the vehicle 900 to the interior space 902. When the fan 31 rotates in the reverse direction, the ventilation system 100 draws air from the interior space 902 to the outside of the vehicle 900.

In one embodiment, the ventilation system 100 further includes an air quality sensor (not shown). The air quality sensor is disposed in the interior space 902, and is configured to measure the air quality within the interior space 902. The controller 51 is configured to determine, based on results of measurement made by the air quality sensor, whether the air quality within the interior space 902 is poor (e.g., particles of toxic substance or cigarette smoke appear in the interior space 902). When it is determined that the air quality within the interior space 902 is poor, the controller 51 is configured to control the fan 31 to rotate in the reverse direction to draw air from the interior space 902 to the outside of the vehicle 900.

In one embodiment, the controller 51 will be instantly activated when the vehicle 900 is unlocked by a remote control. Then, the controller 51 is configured to control the fan 31 to rotate in the reverse direction for a predetermined time period (e.g., five minutes) so as to refresh air in the interior space 902.

The filter 32 is configured to filter air passing through the filter 32 in the vent pipe 2 so as to remove dust particles or hazardous substance from the air.

The cooler 33 is configured to be controlled by the controller 51 to cool air passing through the cooler 33 in the vent pipe 2.

The heater 34 is configured to be controlled by the controller 51 to heat air passing through the heater 34 in the vent pipe 2.

Since techniques of filtering, cooling and heating have been well known to one skilled in the relevant art, detailed explanation of the same is omitted herein for the sake of brevity.

Figure 2:
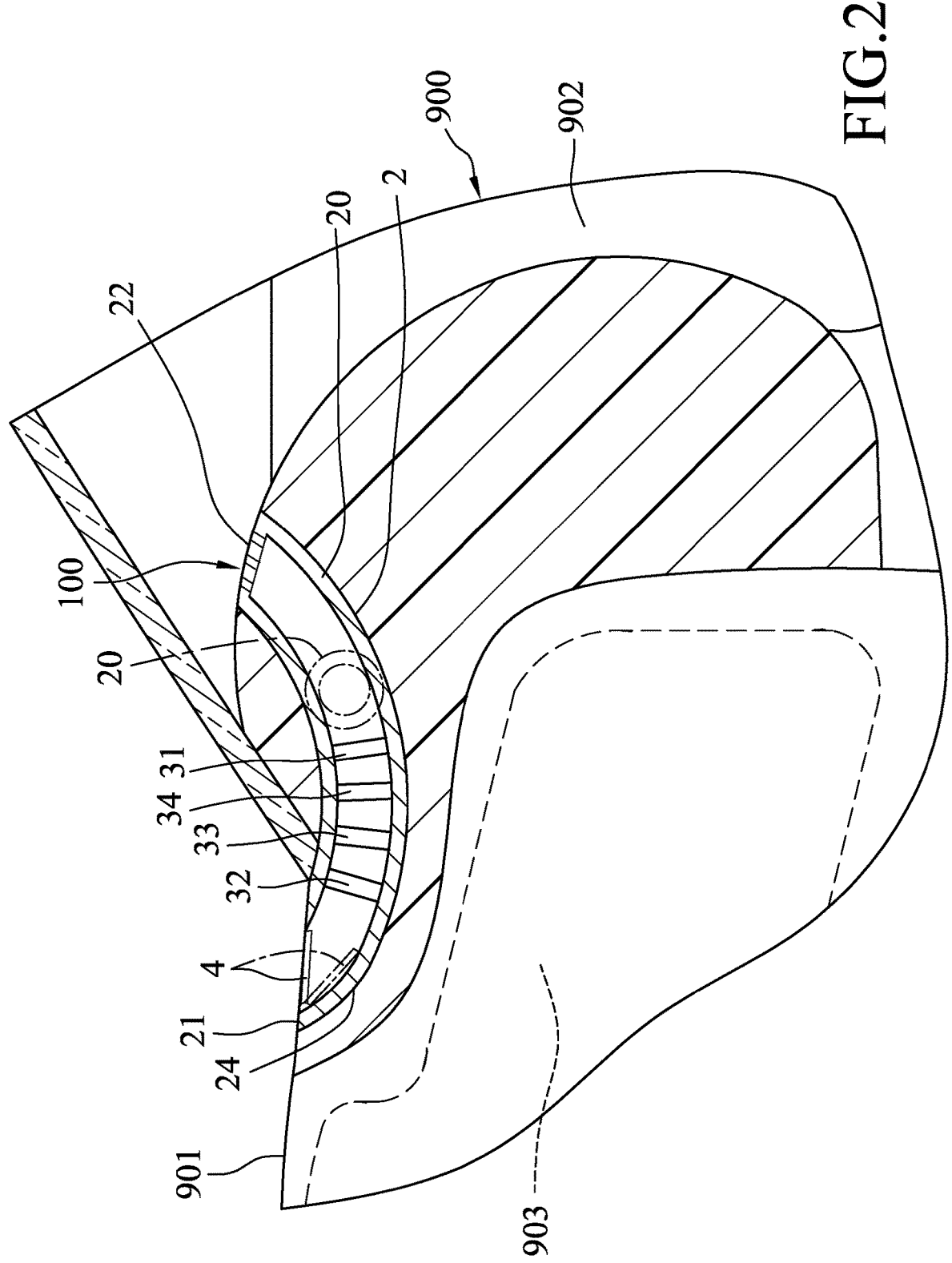
FIG. 2 is an enlarged view of a part of FIG. 1.

The air valve 4 is disposed at the outside communicating end 21 of the vent pipe 2. The controller 51 is configured to control the air valve 4 to switch between an open state where the air valve 4 allows the vent pipe 2 to communicate with the outside of the vehicle body 901, and a closed state where the air valve 4 disallows the vent pipe 2 to communicate with the outside of the vehicle body 901. In FIG. 2, the closed state of the air valve 4 is indicated by sloid lines, and the open state of the air valve 4 is indicated by dashed lines. The air valve 4 may be implemented by an electric valve, but is not limited thereto. Since implementation of the air valve 4 has been well known to one skilled in the relevant art, detailed explanation of the same is omitted herein for the sake of brevity.

It should be noted that in some embodiments, the ventilation system 100 does not include the air valve 4.

The oxygen sensor 52 is adapted to be disposed in the interior space 902 of the vehicle body 901. The oxygen sensor 52 is configured to measure oxygen concentration in the interior space 902 to generate a concentration indication signal, and to output the concentration indication signal to the controller 51.

The controller 51 is operable in one of a triggered ventilation mode and a regular ventilation mode.

The controller 51 is adapted to be further electrically connected to the A/C system 903, and to be notified by the A/C system 903 that the A/C system 903 operates in which one of the internal circulation mode and the external circulation mode. The controller 51 includes a control panel 511 that is disposed in the interior space 902, and a processing unit (not shown) that is configured to implement the operations of the controller 51 described herein. The control panel 511 is configured to be operated by a user to activate the cooler 33 and the heater 34, independently, and to make the controller 51 operate in the triggered ventilation mode or the regular ventilation mode.

In the triggered ventilation mode, the controller 51 is configured to activate the oxygen sensor 52 to measure oxygen concentration in the interior space 902 when the A/C system 903 notifies the controller 51 that the A/C system 903 operates in the internal circulation mode. The controller 51 is further configured to determine whether the oxygen concentration is lower than a low-oxygen-concentration threshold based on the concentration indication signal. When it is determined that a first ventilation condition is satisfied (i.e., that the oxygen concentration is lower than the low-oxygen-concentration threshold), the controller 51 is configured to control the timer 53 to time a preset time period (e.g., five minutes), and during the preset time period, to control the air valve 4 to switch to the open state and to activate the fan 31 to rotate in the forward direction so as to produce airflow from the outside of the vehicle 900 to the interior space 902. When the preset time period has elapsed, the controller 51 is configured to control the air valve 4 to switch to the closed state and to stop the fan 31. In this way, whenever the oxygen concentration falls to an abnormal level, the oxygen concentration in the interior space 902 may be raised to a normal level by the ventilation system 100 that supplies airflow from the outside of the vehicle 900 to the interior space 902.

In the regular ventilation mode, the controller 51 is configured, when the A/C system 903 notifies the controller 51 that the A/C system 903 operates in the internal circulation mode, to control the timer 53 to repeatedly time a first preset duration (e.g., fifteen or thirty minutes) and time a second preset duration (e.g., five minutes) immediately following completion of timing of the first preset duration, to control the air valve 4 to switch to the open state and activate the fan 31 to produce airflow from the outside of the vehicle 900 to the interior space 902 during the second preset duration, and to control the air valve 4 to switch to the closed state and stop the fan 31 during the first preset duration. That is to say, when a second ventilation condition is satisfied (i.e., every time when the first preset duration elapses), the controller 51 controls the air valve 4 to switch to the open state and activates the fan 31 to produce airflow from the outside of the vehicle 900 to the interior space 902. In this way, the oxygen concentration in the interior space 902 may be maintained at a normal level by the ventilation system 100 that periodically supplies airflow from the outside of the vehicle 900 to the interior space 902.

In one embodiment, the controller 51 further includes a power switch 512. The power switch 512 is exposed to the interior space 902, and is electrically connected to an electrical system (not shown) of the vehicle 900. The power switch 512 is operable to enable or disable the controller 51 (i.e., to enable the controller 51, the power switch 512 is turned on to provide electric power from the electrical system to the controller 51), such that the control panel 511 is operable to make the controller 51 operate in the triggered ventilation mode or the regular ventilation mode and that the controller 51 is able to control the fan 31 and the air valve 4 according to results of measurement made by the oxygen sensor 52 (i.e., the triggered ventilation mode) or timing results made by the timer 53 (i.e., the regular ventilation mode).

Figure 6:
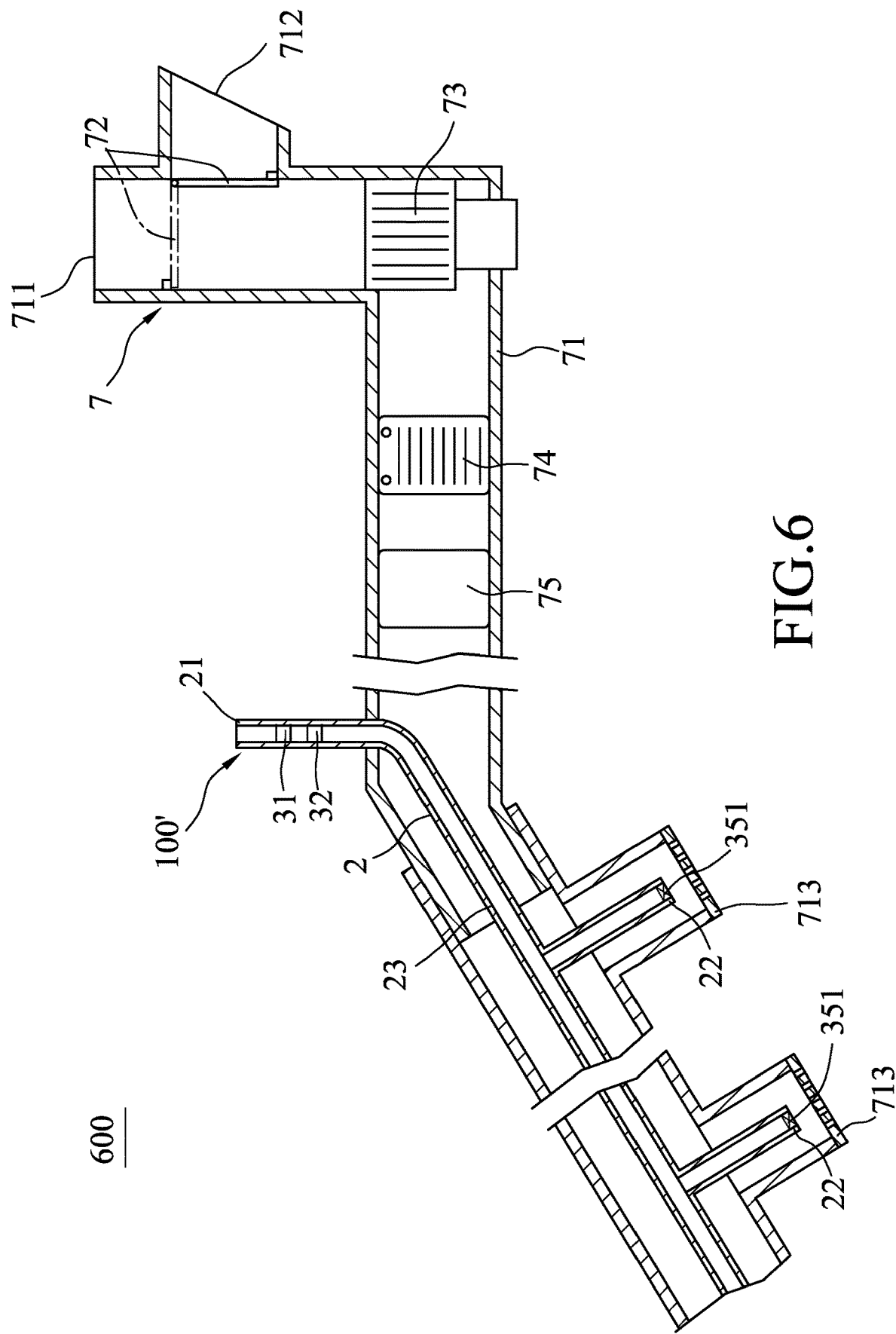
FIG. 6 is a fragmentary sectional view illustrating an example of an air conditioning (A/C) apparatus according to an embodiment of the disclosure.
Figure 7:
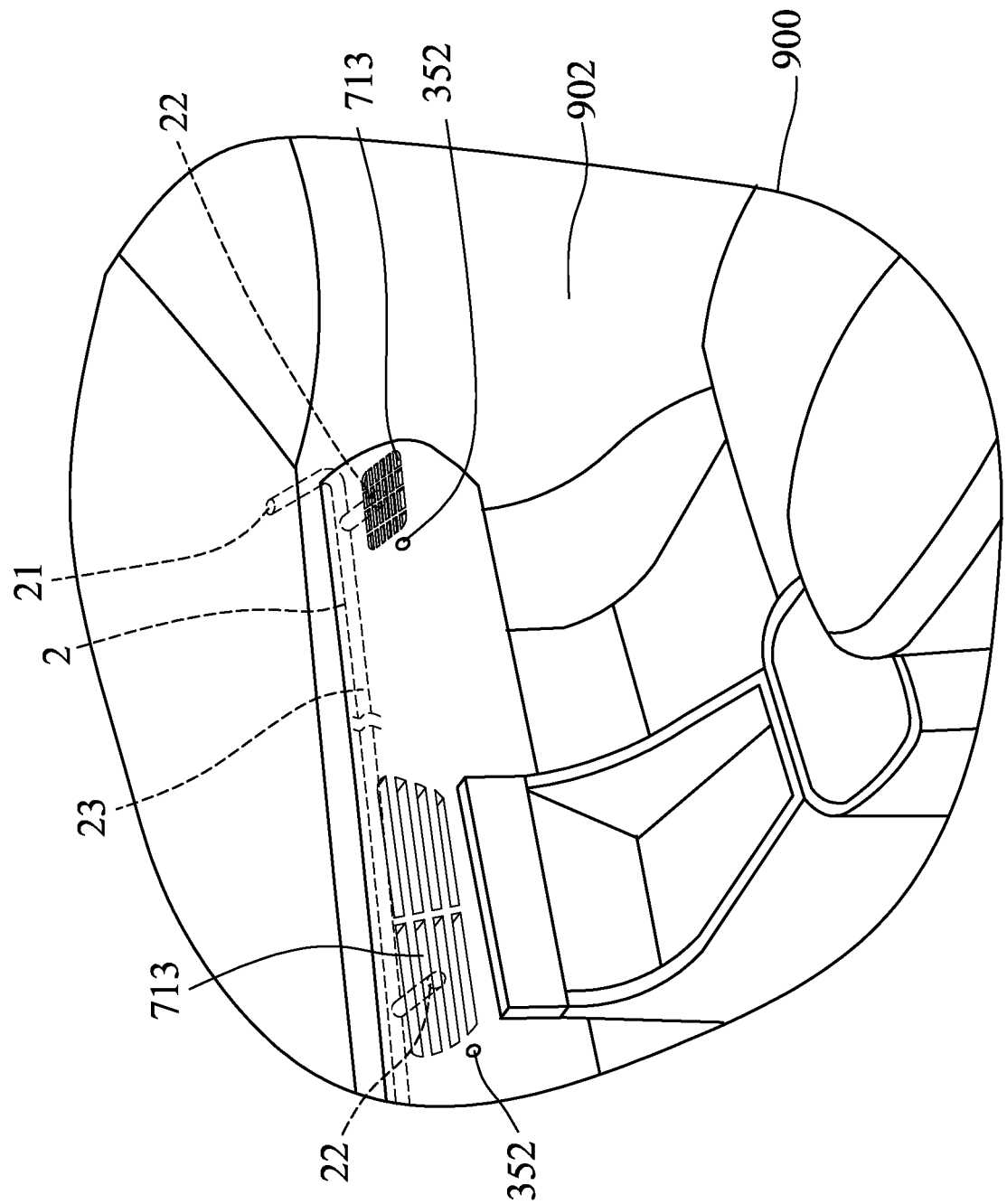
FIG. 7 is a fragmentary perspective view of the interior space of the vehicle for illustrating an example of the A/C apparatus according to an embodiment of the disclosure.
Figure 8:
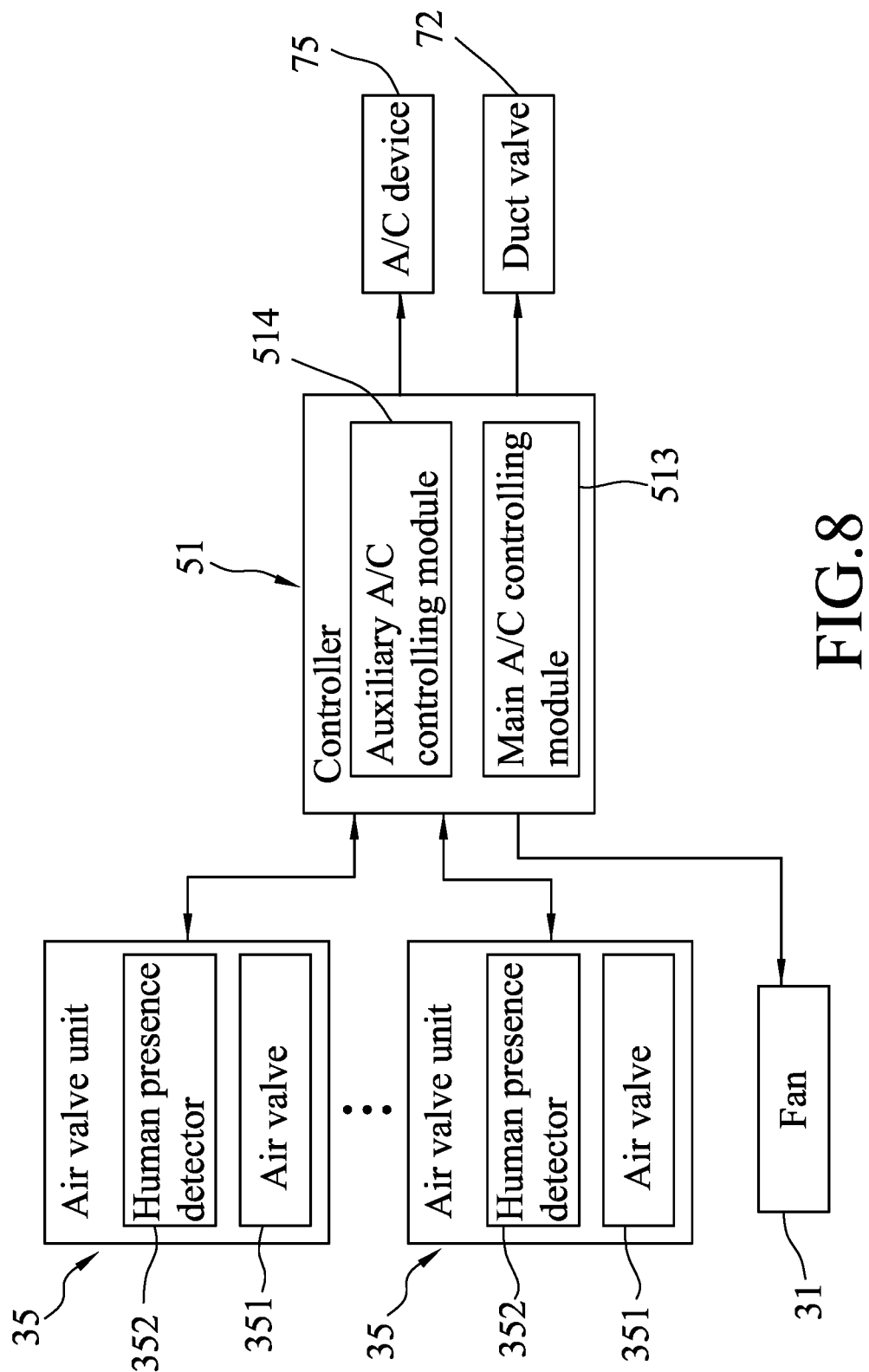
FIG. 8 is a block diagram illustrating an example of the A/C apparatus according to an embodiment of the disclosure.

Referring to FIGS. 6, 7 and 8, an embodiment of an A/C apparatus 600 according to the disclosure is illustrated. The A/C apparatus 600 is adapted to be used in the vehicle 900 that is previously described.

The A/C apparatus 600 includes an A/C system 7 and a ventilation system 100'.

Since the ventilation system 100' is similar to the ventilation system 100 that has been described previously, only differences from the ventilation system 100 are explained in the following for the sake of brevity.

The controller 51 of the ventilation system 100' is further electrically connected to the A/C system 7.

The A/C system 7 is installed in the vehicle 900, and includes an air duct 71, a duct valve 72, a blower 73, a filtering device 74 and an A/C device 75.

The air duct 71 has an external inlet end 711 via which the air duct 71 is adapted to communicate with the outside of the vehicle 900, an internal inlet end 712 via which the air duct 71 is adapted to communicate with the interior space 902 of the vehicle 900, and a plurality of outlet ends 713 via which the air duct 71 is adapted to communicate with the interior space 902 of the vehicle 900. The air duct 71 allows air to flow from the outside of the vehicle 900 via the external inlet end 711 into the air duct 71, allows air to flow from the interior space 902 via the internal inlet end 712 into the air duct 71, and allows air in the air duct 71 to flow into the interior space 902 via the outlet ends 713. It should be noted that only some of the outlet ends 713 are illustrated in FIGS. 6 and 7.

The duct valve 72 is disposed between the external inlet end 711 and the internal inlet end 712. The duct valve 72 is configured to be controlled by the controller 51 to switch between an internal circulation state (indicated by dashed lines) and an external circulation state (indicated by solid lines). When the duct valve 72 is in the internal circulation state, only air in the interior space 902 is allowed to flow into the air duct 71 via the internal inlet end 712 and back to the interior space 902 via the outlet ends 713, and air outside of the vehicle 900 cannot flow into the interior space 902. When the duct valve 72 is in the external circulation state, air outside of the vehicle 900 is allowed to flow into the air duct 71 via the external inlet end 711 and then into the interior space 902 via the outlet ends 713. Since using the duct valve 72 to control air flow has been well known to one skilled in the relevant art, detailed explanation of the same is omitted herein for the sake of brevity.

The blower 73, the filtering device 74 and the A/C device 75 are disposed in the air duct 71. The blower 73 is configured to be controlled by the controller 51 to drive air to flow from the external inlet end 711 or the internal inlet end 712 through the filtering device 74 and the A/C device 75 to the plurality of outlet ends 713.

The filtering device 74 is configured to filter air passing through the filtering device 74 so as to remove undesired substance (e.g., dust particles, pollen, or pathogens) from the air.

The A/C device 75 is configured to be controlled by the controller 51 to regulate temperature (e.g., to warm up or to cool down) of air flowing through the A/C device 75.

Since implementations of the blower 73, the filtering device 74 and the A/C device 75 have been well known to one skilled in the relevant art, detailed explanation of the same is omitted herein for the sake of brevity.

A majority of the vent pipe 2 extends along the air duct 71 in the air duct 71. In this embodiment, the vent pipe 2 has an outside communicating end 21 that is exposed out of the air duct 71, a plurality of inside communicating ends 22 that respectively correspond to the outlet ends 713 of the air duct 71, and a connecting portion 23 that connects the outside communicating end 21 and the inside communicating ends 22. The inside communicating ends 22 are disposed respectively at the outlet ends 713 of the air duct 71 and communicate respectively with the outlet ends 713. The vent pipe 2 is adapted to communicate with the outside of the vehicle 900 via the outside communicating end 21. The vent pipe 2 is adapted to communicate with the interior space 902 of the vehicle 900 via the inside communicating ends 22.

It is worth to note that the connecting portion 23 extends through a posterior portion of the air duct 71 that is spaced apart from the external inlet end 711 and the internal inlet end 712 and that is located behind the blower 73, the filtering device 74 and the A/C device 75 with respect to a direction of airflow from the external inlet end 711 or the internal inlet end 712 to the outlet ends 713. Air flowing through the A/C device 75 will flow through the vent pipe 2, and thus can be utilized to warm up or cool down the vent pipe 2 and air inside the vent pipe 2. It should be noted that the ventilation system 100' does not include the cooler 33 and the heater 34 as with the ventilation system 100 previously described.

The fan 31 is disposed nearby the outside communicating end 21, and is configured to be activated by the controller 51 to produce airflow from the outside communicating end 21 to each of the inside communicating ends 22. However, the location of the fan 31 is not limited to what is disclosed herein and may vary in other embodiments.

The filter 32 is disposed in the vent pipe 2, and is configured to filter air passing through the filter 32 so as to remove undesired substance (e.g., dust particles, pollen, or pathogens) from the air.

The ventilation system 100' further includes a plurality of air valve units 35 that respectively correspond to the inside communicating ends 22 of the vent pipe 2 (and thus respectively correspond to the outlet ends 713). The controller 51 is further electrically connected to the air valve units 35.

The controller 51 includes a main A/C controlling module 513 and an auxiliary A/C controlling module 514. The main A/C controlling module 513 is configured to control the duct valve 72, the blower 73 and the A/C device 75 of the A/C system 7. The auxiliary A/C controlling module 514 is configured to control the fan 31 and the air valve units 35 of the ventilation system 100'.

The main A/C controlling module 513 is configured to be operated to control the duct valve 72 to switch between the internal circulation state and the external circulation state, and to control the A/C device 75 to regulate the temperature of the air flowing therethrough.

It should be noted that each of the main A/C controlling module 513 and the auxiliary A/C controlling module 514 may be implemented by one of hardware, firmware, software, and any combination thereof. For example, the main A/C controlling module 513 and the auxiliary A/C controlling module 514 may be implemented to be software modules in a program, where the software modules contain codes and instructions to carry out specific functionalities of the controller 51, and can be called individually or together.

In one embodiment, each of the air valve units 35 includes an air valve 351 and a human presence detector 352.

The air valve 351 is disposed at a corresponding one of the inside communicating ends 22 of the vent pipe 2, and is configured to be controlled by the auxiliary A/C controlling module 514 of the controller 51 to switch between an open state where the air valve 351 allows the vent pipe 2 to communicate with the interior space 902 via the air valve 351 and a closed state where the air valve 351 disallows the vent pipe 2 to communicate with the interior space 902 via the air valve 351.

The human presence detector 352 is disposed on the vehicle body 901 around one of the outlet ends 713 at which the corresponding one of the inside communicating ends 22 is disposed, and is exposed to the interior space 902. The human presence detector 352 is configured to detect presence of a human in a preset region in front of the corresponding one of the outlet ends 713 in the interior space 902 to generate a presence indication signal, and to output the presence indication signal.

The human presence detector 352 may be implemented by a reflective optical sensor. For example, the human presence detector 352 is configured to emit a light beam, and to receive a reflection of the light beam so as to generate the presence indication signal. Alternatively, the human presence detector 352 may be implemented using infrared detection technologies, in which case the human presence detector 352 is configured to sense infrared light radiated from a human who is on the driver seat or the front passenger seat. However, implementation of the human presence detector 352 is not limited to the disclosure herein and may vary in other embodiments.

In one embodiment, the human presence detector 352 is disposed on a seat of the vehicle 900, and is configured to detect presence of a human based on a weight load of the seat.

It is worth to note that the air valves 351 respectively of the air valve units 35 are disposed respectively at the inside communicating ends 22 of the vent pipe 2. The auxiliary A/C controlling module 514 of the controller 51 is configured to determine, based on the presence indication signals respectively from the human presence detectors 352 respectively of the air valve units 35, whether a human is present in any of the preset regions that are associated respectively with the human presence detectors 352 in the interior space 902. When it is determined that one of the presence indication signals indicates presence of a human in one of the preset regions, the auxiliary A/C controlling module 514 is configured to control one of the air valves 351 that corresponds to one of the human presence detectors 352 that outputted said one of the presence indication signals to switch to the open state, and to activate the fan 31 to produce airflow from the outside communicating end 21 to one of the inside communicating ends 22 that corresponds to said one of the air valves 351. In this way, air flowing from the inside communicating ends 22 of the vent pipe 2 would mix with air flowing from the outlet ends 713 of the air duct 71, and then flow into the interior space 902. Therefore, oxygen concentration in the interior space 902 may be raised.

Figure 9:
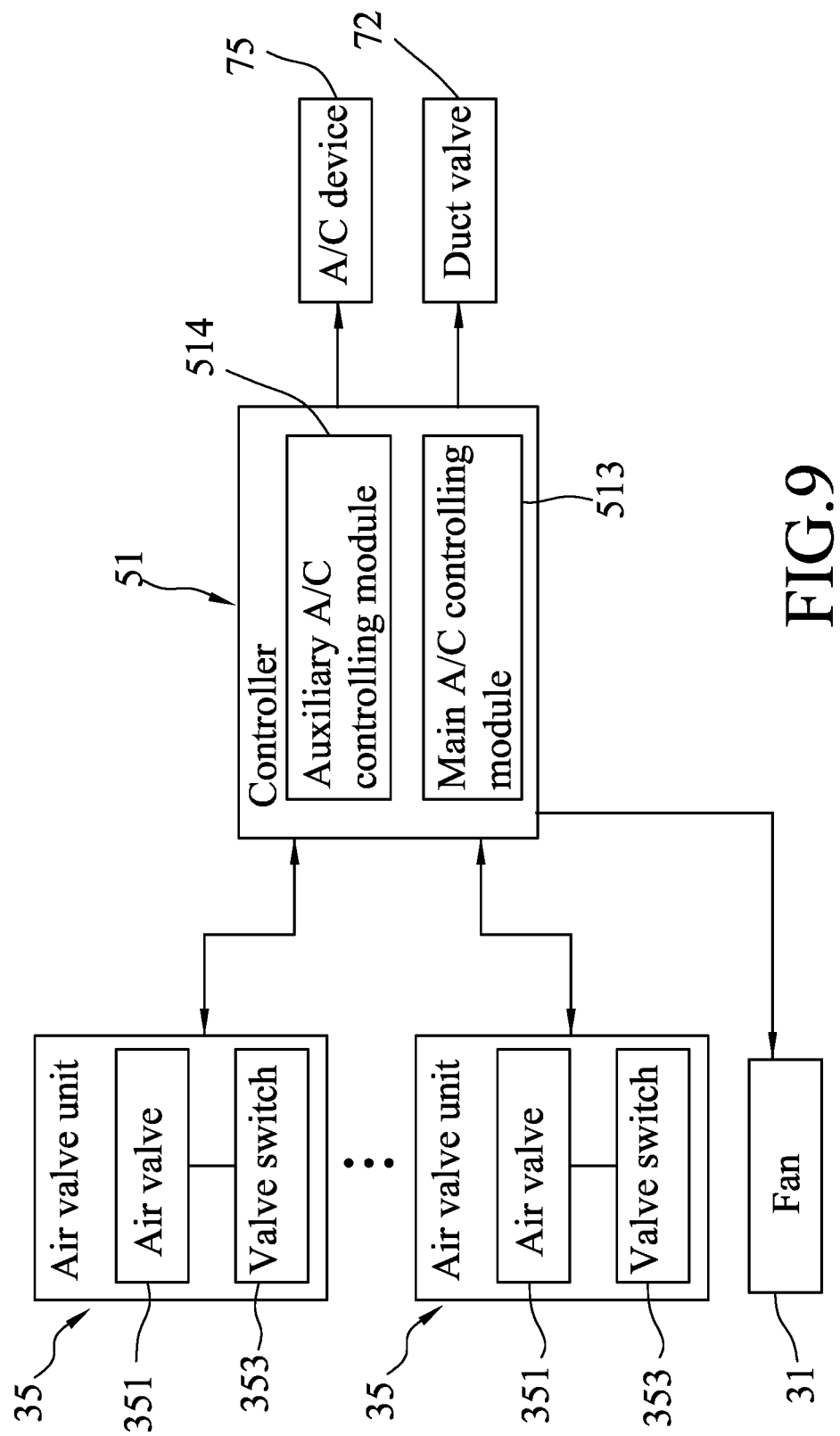
FIG. 9 is a block diagram illustrating another example of the A/C apparatus according to an embodiment of the disclosure.

In one embodiment (see FIG. 9), each of the air valve units 35 includes a valve switch 353, and the air valve 351 as previously described.

The valve switch 353 is disposed on the vehicle body 901, and is exposed to the interior space 902. The valve switch 353 is electrically connected to the air valve 351, and is operable to control the air valve 351 to switch between the open state and the closed state. The valve switch 353 is configured to output a trigger signal to the auxiliary A/C controlling module 514 of the controller 51 when the valve switch 353 is operated by a driver or a passenger.

When the valve switch 353 of one of the air valve units 35 is operated to control the corresponding air valve 351 to switch to the open state, in response to the trigger signal outputted thereby, the auxiliary A/C controlling module 514 of the controller 51 is configured to control the corresponding one of the air valves 351 to switch to the open state, and to activate the fan 31 to produce airflow from the outside communicating end 21 to the corresponding one of the inside communicating ends 22 where the corresponding air valve 351 is disposed. Hence, air flowing from the corresponding one of the inside communicating ends 22 of the vent pipe 2 would mix with air flowing from the corresponding one of the outlet ends 713 of the air duct 71, and then flow into the interior space 902.

In one embodiment, the ventilation system 100' includes only one air valve unit 35. The air valve unit 35 includes an air valve 351 and a human presence detector 352. The air valve 351 is disposed at one of the inside communicating ends 22 of the vent pipe 2, and is configured to be controlled to switch between an open state where the air valve 351 allows the vent pipe 2 to communicate with the interior space 902 and a closed state where the air valve 4 disallows the vent pipe 2 to communicate with the interior space 902. The human presence detector 352 is adapted to be disposed on the vehicle body 901, and is configured to detect presence of a human in a preset region in the interior space 902 to generate a presence indication signal and to output the presence indication signal. The controller 51 is electrically connected to the fan 31 and the air valve unit 35, and is configured to determine, based on the presence indication signal, whether a human is present in the preset region in the interior space 902, and when it is determined that the presence indication signal indicates presence of a human in the preset region, to activate the fan 31 to produce airflow from the outside communicating end 21 to the inside communicating end 22 and to control the air valve 351 to switch to the open state.

In one embodiment, the ventilation system 100' includes only one air valve unit 35. The air valve unit 35 includes an air valve 351 and a valve switch 353. The air valve 351 is disposed at one of the inside communicating ends 22 of the vent pipe 2, and is configured to be controlled to switch between an open state where the air valve 351 allows the vent pipe 2 to communicate with the interior space 902 and a closed state where the air valve 4 disallows the vent pipe 2 to communicate with the interior space 902. The valve switch 353 is disposed on the vehicle body 901, is electrically connected to the air valve 351, and is operable to control the air valve 351 to switch between the open state and the closed state. The controller 51 is electrically connected to the fan 31 and the air valve unit 35, and is adapted to be disposed partially in the interior space 902 of the vehicle body 901. The controller 51 is configured to activate the fan 31 to produce airflow from the outside communicating end 21 to the inside communicating end 22 when the air valve 351 switches to the open state.

In one embodiment, the ventilation system 100 that is previously described with reference to FIGS. 1 to 5 further includes the air valve units 35 as described in connection with FIGS. 6 to 8 or FIG. 9.

In one embodiment, the ventilation system 100' of the A/C apparatus 600 is identical to the ventilation system 100 that is previously described.

To sum up, the ventilation system according to the disclosure forces air to flow from the outside of a vehicle to an interior space of the vehicle when it is determined that oxygen concentration in the interior space is lower than a threshold, and regularly forces air to flow from the outside of the vehicle to the interior space of the vehicle when an A/C system of the vehicle operates in the internal circulation mode. In this way, the oxygen concentration in the interior space can be ensured to be maintained at a normal level, so issues of fatigue driving or drowsy driving due to low oxygen concentration may be alleviated.

It should be noted that the ventilation system can be implemented to be separated from an A/C system of the vehicle, or can be integrated with the A/C system as an A/C apparatus. When the ventilation system is integrated with the A/C system, the ventilation system is capable of adjusting temperature of the airflow by utilizing the A/C system without an additional cooler or an additional heater. Moreover, placing inside communicating end(s) of the ventilation system in proximity to outlet end(s) of the A/C system allows air flowing out of the ventilation system and air flowing out of the A/C system to rapidly mix together and then spread throughout the interior space, thereby minimizing temperature difference, to which a person may not adapt well, of air flowing from the ventilation system and the A/C system.

In the description above, for the purposes of explanation, numerous specific details have been set forth in order to provide a thorough understanding of the embodiments. It will be apparent, however, to one skilled in the art, that one or more other embodiments may be practiced without some of these specific details. It should also be appreciated that reference throughout this specification to "one embodiment," "an embodiment," an embodiment with an indication of an ordinal number and so forth means that a particular feature, structure, or characteristic may be included in the practice of the disclosure. It should be further appreciated that in the description, various features are sometimes grouped together in a single embodiment, figure, or description thereof for the purpose of streamlining the disclosure and aiding in the understanding of various inventive aspects, and that one or more features or specific details from one embodiment may be practiced together with one or more features or specific details from another embodiment, where appropriate, in the practice of the disclosure.

While the disclosure has been described in connection with what are considered the exemplary embodiments, it is understood that this disclosure is not limited to the disclosed embodiments but is intended to cover various arrangements included within the spirit and scope of the broadest interpretation so as to encompass all such modifications and equivalent arrangements.

What is claimed is:

1. An air conditioning (A/C) apparatus, adapted to be used in a vehicle, the vehicle including a vehicle body that defines an interior space, said A/C apparatus comprising:
   an A/C system including
      an air duct that has an external inlet end via which said air duct is adapted to communicate with the outside of the vehicle, and a plurality of outlet ends via which said air duct is adapted to communicate with the interior space of the vehicle, an A/C device that is disposed in said air duct, and that is configured to be controlled to regulate temperature of air flowing through said A/C device, and a blower that is disposed in said air duct, and that is configured to be controlled to drive air to flow from said external inlet end through said A/C device to said plurality of outlet ends; and a ventilation system including a vent pipe, a majority of which extends along said air duct in said air duct, and which has an outside communicating end exposed out of said air duct, said vent pipe being adapted to communicate with the outside of the vehicle via said outside communicating end, and at least one inside communicating end disposed at one of said plurality of outlet ends of said air duct and communicating with said one of said plurality of outlet ends, said vent pipe being adapted to communicate with the interior space of the vehicle via said at least one inside communicating end, and p1 a fan which is disposed in said vent pipe, and which is configured to be activated to produce airflow from said outside communicating end to said at least one inside communicating end.

2. The A/C apparatus as claimed in claim 1, wherein:

said ventilation system further includes an air valve that is disposed at said vent pipe, and a controller that is electrically connected to said air valve and said fan; and said controller is configured to control said air valve to switch between an open state where said air valve allows said vent pipe to communicate with the outside of the vehicle body, and a closed state where said air valve disallows said vent pipe to communicate with the outside of the vehicle body, and activate said fan to produce airflow from said outside communicating end to said at least one inside communicating end when controlling said air valve to switch to the open state.

3. The A/C apparatus as claimed in claim 2, wherein said controller includes:

a main A/C controlling module that is configured to control said A/C device and said blower; and an auxiliary A/C controlling module that is configured to control said air valve and said fan.

4. The A/C apparatus as claimed in claim 1, further comprising a controller, wherein:

said at least one inside communicating end includes a plurality of inside communicating ends that respectively correspond to said outlet ends of said air duct;

said ventilation system further includes at least one air valve unit that includes an air valve which is disposed at one of said inside communicating ends of said vent pipe, and which is configured to be controlled to switch between an open state where said air valve allows said vent pipe to communicate with the interior space and a closed state where said air valve disallows said vent pipe to communicate with the interior space, and a valve switch which is adapted to be disposed on the vehicle body, which is electrically connected to said air valve, and which is operable to control said air valve to switch between the open state and the closed state; and said controller is electrically connected to said fan and said at least one air valve unit, and is configured to activate said fan to produce airflow from said outside communicating end to said at least one inside communicating end when said air valve switches to the open state.

5. The A/C apparatus as claimed in claim 4, wherein:

said at least one air valve unit includes a plurality of air valve units that respectively correspond to said inside communicating ends of said vent pipe;

said air valves respectively of said air valve units are disposed respectively at said inside communicating ends of said vent pipe; and when said valve switch of one of said air valve units is operated to control the corresponding one of said air valves to switch to the open state, said controller is configured to activate said fan to produce airflow from said outside communicating end to the corresponding one of said inside communicating ends where the corresponding one of said air valves is disposed.

6. The A/C apparatus as claimed in claim 1, further comprising a controller, wherein:

said at least one inside communicating end of said vent pipe includes a plurality of inside communicating ends that respectively correspond to said outlet ends of said air duct;

said ventilation system further includes at least one air valve unit that includes an air valve which is disposed at one of said inside communicating ends of said vent pipe, and which is configured to be controlled to switch between an open state where said air valve allows said vent pipe to communicate with the interior space and a closed state where said air valve disallows said vent pipe to communicate with the interior space, and a human presence detector which is adapted to be disposed on the vehicle body, which is configured to detect presence of a human in a preset region in the interior space to generate a presence indication signal and to output the presence indication signal; and said controller is electrically connected to said fan and said at least one air valve unit, and is configured to determine, based on the presence indication signal, whether a human is present in the preset region in the interior space, and when it is determined that the presence indication signal indicates presence of a human in the preset region, to activate said fan to produce airflow from said outside communicating end to said at least one inside communicating end and to control said air valve to switch to the open state.

7. The A/C apparatus as claimed in claim 6, wherein:

said at least one air valve unit includes a plurality of air valve units that respectively correspond to said inside communicating ends of said vent pipe, and said air valves respectively of said air valve units are disposed respectively at said inside communicating ends of said vent pipe; and said controller is configured to determine, based on the presence indication signals respectively from said human presence detectors respectively of said air valve units, whether a human is preset in any of the preset regions that are associated respectively with said human presence detectors in the interior space, and when it is determined that one of the presence indication signals indicates presence of a human in one of the preset regions, to activate said fan to produce airflow from said outside communicating end to said at least one inside communicating end and to control one of said air valves that corresponds to one of said human presence detectors that outputted said one of the presence indication signals to switch to the open state.

\* \* \* \* \*